(12) United States Patent
Sueoka

(10) Patent No.: US 6,185,405 B1
(45) Date of Patent: Feb. 6, 2001

(54) IMAGE READING APPARATUS AND SHEET GUIDE THEREFOR

(75) Inventor: Hideki Sueoka, Atsugi (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/119,046

(22) Filed: Jul. 20, 1998

(30) Foreign Application Priority Data

Jul. 18, 1997 (JP) .................................................... 9-193795
Apr. 10, 1998 (JP) .................................................. 10-099384

(51) Int. Cl.[7] ............................ G03G 15/00; H04N 1/00; B65H 5/06

(52) U.S. Cl. ............................ 399/367; 271/8.1; 355/50; 358/496; 358/498

(58) Field of Search ..................................... 399/365, 367, 399/203, 206; 355/48, 50, 75; 271/8.1, 264, 272; 358/496, 498

(56) References Cited

U.S. PATENT DOCUMENTS 5,040,781 * 8/1991 Matoba ................................. 271/242
5,680,203 * 10/1997 Kobayashi et al. .................... 355/76
5,826,155 * 10/1998 Kobayashi et al. .................. 399/367

* cited by examiner

*Primary Examiner*—Joan Pendegrass
(74) *Attorney, Agent, or Firm*—Oblon, Spivak, McClelland, Maier & Neustadt, P.C.

(57) ABSTRACT

A sheet guide in an image reading apparatus guides a sheet fed from a pair of rollers to a scanning point on a contact glass includes a pair of notched portions for bearing forces applied by at least one of the rollers, a sheet bearing portion for guiding the sheet fed by the rollers, wherein the image bearing portion guides the sheet fed out from the rollers to lower an angle incidence which the sheet forms with the contact glass. The sheet bearing edge is positioned toward a lower position of a nip between the rollers and changes the angle of incidence to become closer to horizontal with respect to the contact glass, than if the sheet were unguided.

28 Claims, 5 Drawing Sheets

SCANNING POINT

IMAGE READING APPARATUS AND SHEET GUIDE THEREFOR

BACKGROUND OF THE INVENTION

1. Field of the Invention

The present invention relates to an image reading apparatus such as a document reader, a scanner, a copy machine, a facsimile machine, etc., and particularly to an image reading apparatus having a sheet guide.

2. Description of the Related Art

In the conventional art, there is an image reading apparatus capable of scanning both book-type documents and sheet-type documents. Book-type documents are bound, while sheet-type documents are made of loose-leaf pages. For sheet-type documents, the conventional image reading apparatus employs an automatic document feeder (ADF) to successively feed the sheets to a scanning position where a scanner (or image sensor) reads respective images from the sheets. Because the pages in the book-type document are bound, it is not possible to use the ADF, so in order to scan the pages, the operator opens the book-type document, places the open page(s) on a contact glass, and an image sensor moves beneath the contact glass in order to read the image(s) on the open page(s). Thus, the way in which images are scanned depends on the type of original document.

When the image reading apparatus scans the sheet-type document, the sheets are stacked on a document table and each sheet is successively fed into the ADF and conveyed to a fixed scanning position where the sheet is scanned by the image sensor, which is held in place while the sheet moves across the scanning point, and then the scanned sheet is conveyed to an external discharge tray.

For use with the book-type document, the conventional image reading apparatus includes a pressing board that is a hinged cover and is used to press the book document against the contact glass so as to flatten the subject page(s) against the contact glass. Accordingly, the contact glass must be at least as large as the pages of the book-type document so that the images may be completed scanned. In contrast, when scanning individual sheets of the sheet-type document, a relatively small contact glass is required, because the image sensor remains stationary and thus the contact glass need not be larger than that required to support the stationary image sensor.

Figure 1:
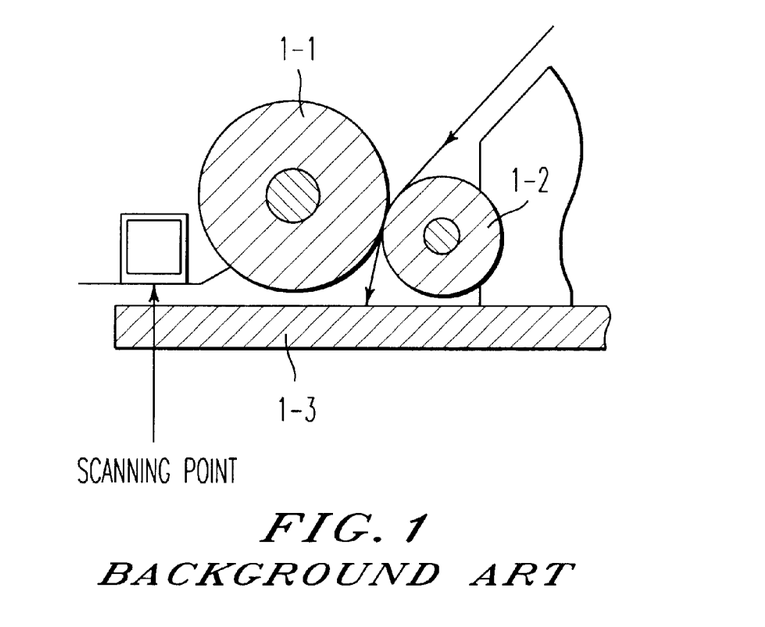
FIG. 1 is a partial section view of a background art automatic document feeder (ADF) for an image reading apparatus.

As recognized by the present inventor, a difficulty arises in integrating the ADF and contact glass of uniform thickness in a single device that performs both a book-scanning mode of operation and a sheet-scanning mode of operation. In the conventional image reading apparatus, a document table that holds the stack of sheets to be scanned is located on top of the pressing board, adjacent to the ADF. Accordingly, the stack of sheets is elevated with respect to the portion of the contact glass that is used for the sheet-scanning mode of operation. This disparity in height requires that the ADF transport each sheet in a nearly vertical direction (see the curved arrow in FIG. 1) when moving the sheets to the scanning position. As will be discussed, moving the sheet toward the contact glass at such a steep angle gives rise to several problems, including susceptibility to paper jams and image reading synchronization problems. As seen in FIG. 1, each sheet is grasped at a nip portion between a resist roller 1-1 and press roller 1-2, where the movement of the resist roller 1-1 and press roller 1-2 urge the sheet toward the contact glass 1-3 in the direction shown by the arrow.

As presently recognized by the inventor, the steep inclination angle increases the likelihood of the sheet buckling (or crinkling) when a leading edge of the sheet hits the contact glass. In order to lower the angle incidence, and thus avoid the paper jam and synchronization problems, two candidate solutions include lowering the press roller 1-2, and lifting the resist roller 1-1 to a higher position than that shown in FIG. 1.

In the former option, the press roller 1-2 can only be lowered by a slight amount, otherwise the press roller 1-2 will come in contact with the contact glass 1-3. If the press roller 1-2 contacts the contact glass 1-3, the motor that drives the press roller 1-2 will become overloaded and unduly strained. Thus, a clearance is maintained between the press roller 1-2 and contact glass 1-3. In order to further lower the press roller 1-2, the contact glass may be thinned so as to accommodate the press roller 1-2 at a lower position. However, creating the thinned portion increases manufacturing cost, lowers the structural integrity of the contact glass, and adversely affects the uniformity of scanning conditions between the sheet-scanning mode of operation and the book-scanning mode of operation.

Figure 2:
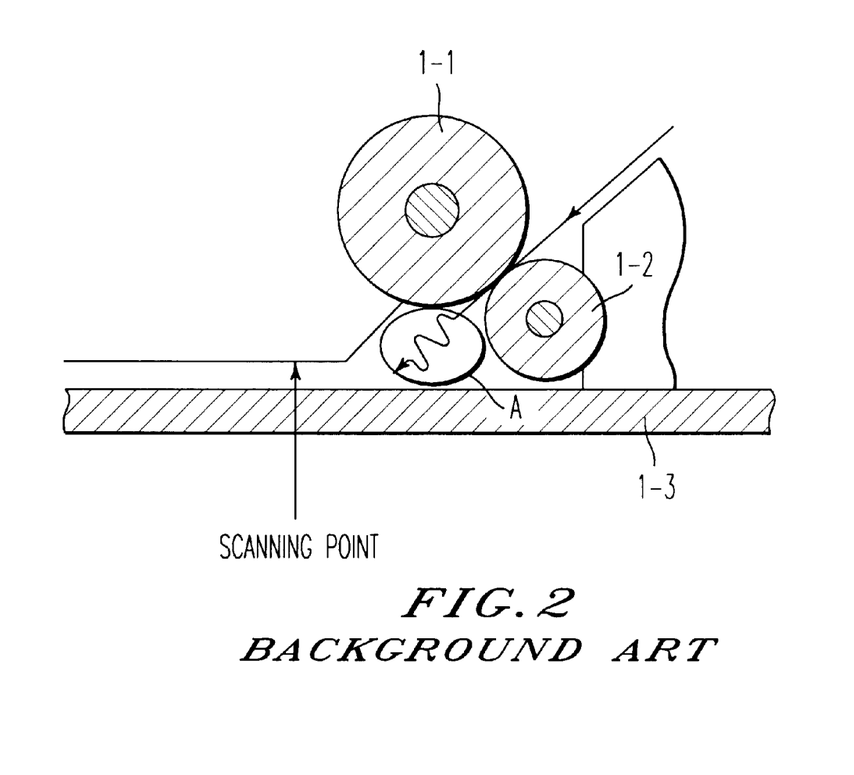
FIG. 2 is a partial section view of another background art ADF for an image reading apparatus.

Regarding the latter option, the space 'A' (see FIG. 2) formed by the resist roller 1-1, press roller 1-2 and contact glass 1-3 is expanded in FIG. 2 to show what happens when the resist roller 1-1 is lifted. When lifted, the space A becomes large and thus, provides a sizable "unguided" area where the sheet fed by the ADF is free to bend and possibly crinkle when the sheet contacts the contact glass 1-3. Moreover, failing to guide the sheet in the space A increases the likelihood that the tip of the sheet will crinkle, and thus jam the ADF. Furthermore, when this crinkling problem occurs, the sheet does not reach the scanning point at a predetermined time period when the scanning operation is initiated. Namely, the image reading apparatus controls the timing of a document reading operation based on a trigger signal sent by a sensor located upstream from the nip between the resist roller 1-1 and press roller 1-2. So, when the tip of the document crinkles, but does not jam the ADF, a timing problem occurs in that the synchronization of the arrival of the sheet to the scanning point and the beginning of a scanning cycle is adversely effected.

Accordingly, the present inventor identified the desirability of providing an upper and a lower sheet guide along a document path in the space 'A' to solve this problem. However, it is difficult to provide a lower sheet guide in this region because the contact glass 1-3 extends from the scanning point to beneath the press roller 1-2. Nonetheless, in the conventional device, even if a sheet guide could be included in this area, it would nonetheless be difficult to decrease the angle of incidence (measured between the contact glass and underside of the sheet that faces the press roller 1-2) by changing the position of the resist roller 1-1 or press roller 1-2 without creating other problems, such as burning-out the drive motor for the press roller 1-2 or "crinkling" the respective sheets, which causes jam problems and scanning synchronization problems.

SUMMARY OF THE INVENTION

Accordingly, one object of the present invention is to overcome the above-mentioned and other problems associated with conventional devices. This and other objects are accomplished by the present invention, a brief non-exhaustive summary of which is provided in the present section.

The present invention includes a sheet guide that guides a document fed out from a pair of rollers to a fixed scanning point on a contact glass, when operated in a sheet-type scanning mode of operation. The sheet guide includes a base that rests on the contact glass and a pair of sidewalls that extend vertically on opposing sides of the base. Each side wall has a notch portion formed therein that receives an axle of one of the rollers and permits the roller to rotate in the notch portion. A forward edge of each side wall serves as a sheet bearing edge that guides a leading edge of the sheet to the contact glass. The sheet bearing edge changes the angle of incidence of the sheet and the contact glass, with respect to an unguided condition, so as to minimize the likelihood of the sheet crinkling and causing a paper jam and/or a scanning synchronization problem.

BRIEF DESCRIPTION OF THE DRAWINGS

The above-mentioned and other objects and further features of the present invention will become apparent from the following detailed description when read in conjunction with the accompanying drawings, wherein.

DESCRIPTION OF THE PREFERRED EMBODIMENT

Figure 3:
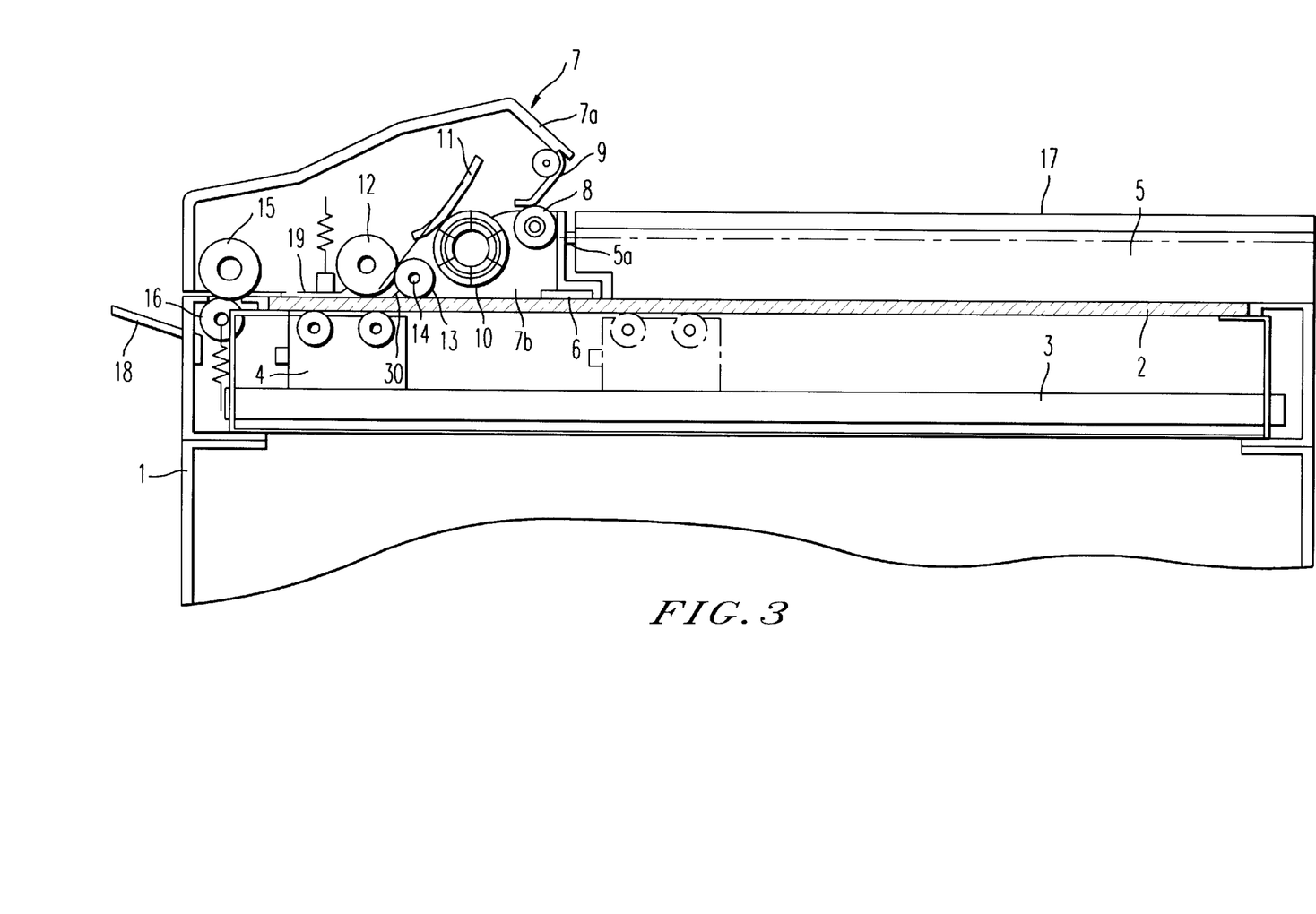
FIG. 3 is a section view of an image scanning apparatus according to the present invention.

Referring now to the drawings, wherein like reference numerals designate identical or corresponding parts throughout the several views, and more particularly to FIG. 3 thereof, FIG. 3 is a sectional view of an image reading apparatus according to the present invention. The image reading apparatus includes a main body 1, a contact glass 2, a guide shaft 3, a carriage 4 having an image sensor, a pressing board 5, a first white board 6, an automatic document feeder (ADF) 7, a pick-up roller 8, a pressing plate 9, a feed roller 10, a separation pad 11, a resist roller 12, a resist pressure roller 13, a feed-out roller 15, a feed-out pressure roller 16, a document table 17, a document stacker 18, and a second white board 19, arranged as shown in FIG. 3. The resist pressure roller 13 is supported by a sheet guide 30, which will be the focus of subsequent discussions regarding FIG. 4 to FIG. 10.

The contact glass 2 is uniformly thick and is fixed on a horizontal plane of a main body 1. Book-type documents to be scanned are pressed against the portion of the contact glass 2 under the cover 5, while sheet-type documents fed by the ADF 7 are scanned over the contact glass 2 in the vicinity of the second white board 19. The contact glass 2 extends next to the feed-out roller 15 and the feed-out pressure roller 16.

The guide shaft 3 is provided in the main body 1 in parallel with the contact glass 2 and guides a carriage 4. The carriage 4 on which an image sensor is mounted moves freely (as shown by the dashed outline of the carriage 4) along the guide shaft 3 to scan an image of a book-type document placed on the contact glass 2 and contacts the lower surface of the contact glass 2 by contact rollers. The image sensor in the carriage includes an LED or other illumination device that illuminates the image of the document and receives reflected light via an optics system and detects features of the image with a detection device, such as a charge-coupled device. When scanning a sheet fed from the ADF 7, the carriage 4 remains fixed at a scanning position, as shown in FIG. 3.

When operating in a book-scanning mode of operation, the carriage 4 first moves to a first white board 6 so as to obtain a calibration reading for shading correction processing. In the sheet-scanning mode of operation, the carriage 4 takes a calibration reading on the second white board 19. Moreover, when the image reading apparatus reads a document placed on the contact glass 2, the carriage 4 moves to a position under the first white board 6, and image sensor scans the first white board 6 before scanning the book-document for calibration purposes. When the image reading apparatus reads a document fed through the ADF 7, the carriage 4 moves to a position under a second white board 19, and image sensor scans the second white board 19 before scanning the sheet.

The pressing board 5 pivots about an axis 5a, so as to open and close with respect to the contact glass 2 and allow an operator to insert a document on the contact glass 2 and then cover the document when the carriage 4 scans the document. The pressing board 5 doubles as a document table 17 that hosts a stack of loose-leaf pages to be fed into the ADF 7 during a scanning mode of operation.

The ADF 7 is positioned at a side of the pressing board 5 and includes an upper unit 7a and lower unit 7b. The upper unit 7a pivots about an axis near the paper ejection tray 18 so as to open and close relative to the lower unit 7b. The upper unit 7a has a pressing plate 9, a separation pad 11, a resist roller 12, a second white plate 19, a feed-out roller 15 arranged as shown in FIG. 3. The lower unit 7b has a pick-up roller 8, a feed roller 10, and a resist pressure roller 13 supported by a coaxially arranged metal rotation axle 14. When the upper unit 7a is closed, the pressing plate 9, separation pad 11 and resist roller 12 make contact with the pick-up roller 8, feed roller 10 and resist pressure roller 13 respectively, and the feed-out roller 15 makes contact with the feed-out pressure roller 16 provided in the main body 1. The feed-out pressure roller 16 is pressed toward the document feed-out roller 15 by a spring.

When the image reading apparatus scans a document placed on the contact glass 2 (i.e., during a book-scanning mode of operation), the carriage 4 moves along the guide shaft 3 according to a scanning size of the document, and the image sensor (that includes an illumination device such as an LED and a photodetector, such as a CCD) scans the document.

On the other hand, when the image reading apparatus scans a sheet fed through the ADF 7, the carriage 4 is held fixed at a stationary scanning position while the ADF moves the document over the carriage 4. Moreover, the pick-up roller 8 feeds sheets one-by-one from the document table 17, as the sheets are separated by the separation pad 11 and feed roller 10. After separation and initial feeding, each separated sheet is fed to the scanning position by the resist roller 12 and resist pressure roller 13, and scanned by the contact-type image sensor mounted on the carriage 4. After scanning, the feed-out roller 15 and feed-out pressure roller 16 eject the scanned sheet to the document stacker 18.

Next, a description will be given of how the sheet guide 30 is incorporated into the ADF 7 according to a first embodiment of the present invention.

Figure 4:
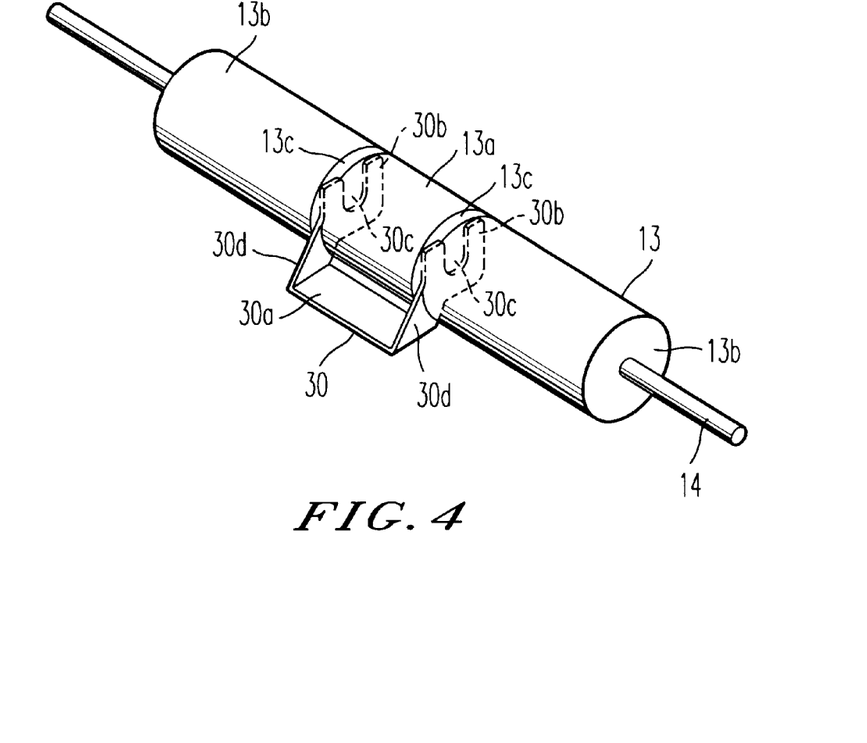
FIG. 4 is a perspective view of a sheet guide and resist pressure roller according to a first embodiment of the present invention.
Figure 5:
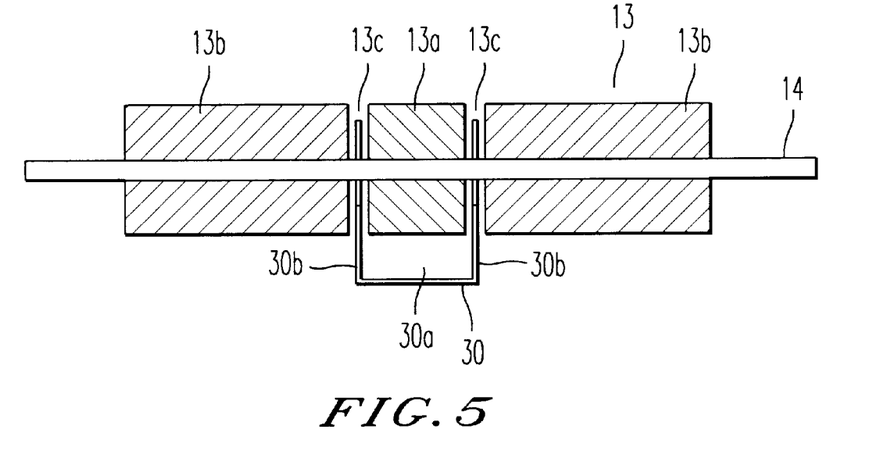
FIG. 5 is a section view of the sheet guide and resist pressure roller of FIG. 4.

In FIGS. 4 and 5, a guide member 30 has a bottom portion 30a (i.e., a base) and respective side walls 30b integrally connected at opposing sides of the bottom portion 30a. Each side wall 30b has a U-shaped notch 30c (although other shapes such as V-shaped or rectangular shaped notches may be used as well) and straight slope 30d formed as a sheet bearing edge between a top of the bottom portion U-shaped notch 30c. The guide member of the U-shaped notch 30c. The guide member 30 is manufactured by molding a material, such as plastic, to form one piece, or using a direct injection molding process. Although metal, fiberglass or other relatively rigid materials would work as well.

The resist pressure roller 13 is constructed by a center roller 13a and a pair of end rollers 13b, and each roller 13a, 13b is separately fixed in this embodiment on a rotation axle 14. Thus, the resist pressure roller 13 is segmented, but each segment is hosted on the axle 14. The end rollers 13b are located at each end of the center roller 13a with a clearance 13c as shown in FIG. 5. An outer peripheral portion of each roller 13a, 13b is formed by a rigid body, for example plastic. An outer peripheral portion of the resist roller 12 is formed by an elastic member, for example rubber, so it is possible to pinch and frictionally grasp a sheet between rollers 12 and 13 at a nip portion so as to feed the sheet to the scanning area.

When the guide member 30 and resist pressure roller 13 are mounted in the lower unit 7b, both side walls 30b are placed in respective notch clearance 13c. Accordingly, the U-shaped notches 30c make contact with and bear a load of the rotation axle 14, while allowing the rotation axle 14 to rotate.

The bottom portion 30a makes contact with, and rests on, the contact glass 2 and the sheet bearing edge 30d is oriented toward a lower position of the nip between the resist roller 12 and resist pressure roller 13. The sheet bearing edge 30d is shaped and oriented so as to reduce the risk of the sheet becoming crinkled; preferably an angle of attack is in an inclusive range of 45° to 60°, with respect to the contact glass 2. Further, the sheet-bearing edge of sheet bearing edge 30d is retained in the notch portions 13c near the nip with the resist roller 12 so as to avoid contacting the resist roller 12.

Figure 6:
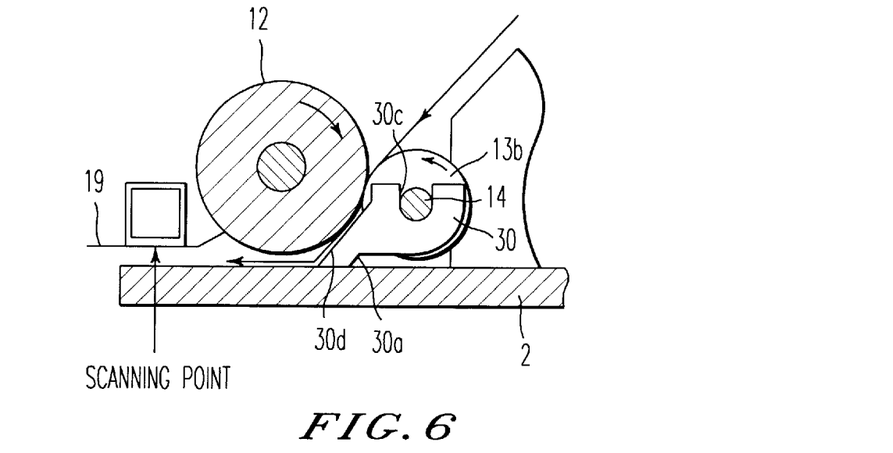
FIG. 6 is a section view of the first embodiment of the present invention for explaining a document feeding operation.

Next, a description is given of a document feeding operation according to the first embodiment of the present invention, while referring to FIG. 6. The resist roller 12 is rotated in a clockwise direction and the resist pressure roller 13 is rotated in a counterclockwise direction as shown in FIG. 6. The sheet to be fed is pinched between the resist roller 12 and resist pressure roller 13, and fed in the direction of the arrow toward the contact glass 2. At this time, the sheet fed from the nip between the resist roller 12 and resist pressure roller 13 hits the sheet bearing edge 30d (a straight slope in this embodiment) and is guided toward the contact glass 2. So, an angle that the document forms with the contact glass 2 is decreased by sheet bearing edge 30d, and the sheet is assuredly fed toward the contact glass 2 at a convenient angle with little risk of experiencing sheet-crinkle, and related paper jams and synchronization problems.

Accordingly, it is possible to feed the sheet to the scanning point smoothly because the tip of the sheet makes contact with the contact glass 2 after changing the angle of incidence to be close to a horizontal angle with respect to the contact glass 2 by way of the guide member 30.

An advantage of the present configuration is that the inclusion of the guide member 30 does not necessitate repositioning of the resist roller 12 and resist pressure roller 13 because the guide member 30 and resist pressure roller 13 overlap one another. The inclusion of the guide member 30 does not require alteration to the planar structure of the contact glass 2 (e.g., no grooves or etchings are required to accommodate the sheet guide 30 on the contact glass 2). Furthermore, it is possible to make the guide member 30 at low-cost because it is made by a manufacturing molding process and formed in one piece.

Figure 7:
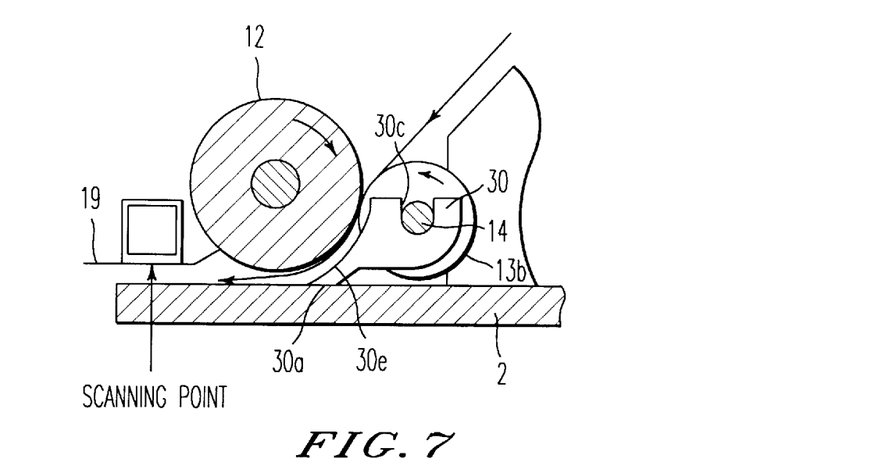
FIG. 7 is a section view of the second embodiment of the present invention for explaining a document feeding operation.

Next, by referring to FIG. 7, a description is given of a second embodiment of the present invention, where the guide member 30 has a curved sheet bearing edge 30e instead of the straight slope of the sheet bearing edge 30d shown in FIGS. 4 and 6. This curved slope of the sheet bearing edge 30e is a difference between the first embodiment and second embodiment, and aside from this difference the embodiments are otherwise similar.

The sheet bearing edge 30e is formed between the tip of the bottom portion 30a and U-shaped notch 30c. A shape of the curve slope 30e has approximately a same shape as the periphery of the resist roller 12, so as to maintain an approximately constant distance from the resist roller 12 and the sheet bearing edge 30e. So, the edge of curve slope 30e near the contact glass is able to be positioned relatively close to the periphery of the resist roller 12 than the straight slope 30d and thus surely prevents the problem of conventional devices as illustrated in FIG. 2. The related positions of the periphery of the resist roller 12 and the sheet bearing edge 30e cooperate to serve as upper and lower sheet guides that reduce the amount of freedom of movement for the leading edge of the sheet as it is passed to the scanning surface of the contact glass 2. Moreover, it is possible to change an angle of the sheet to be more close to a horizontal orientation than if unguided and thus ensures the document is guided smoothly and reliably.

Figure 8:
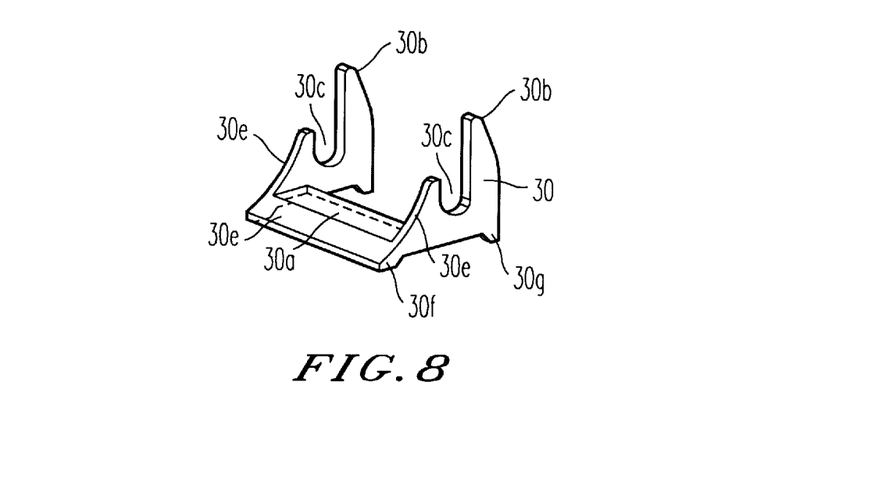
FIG. 8 is a perspective view of a sheet guide according to a third embodiment of the present invention.
Figure 9:
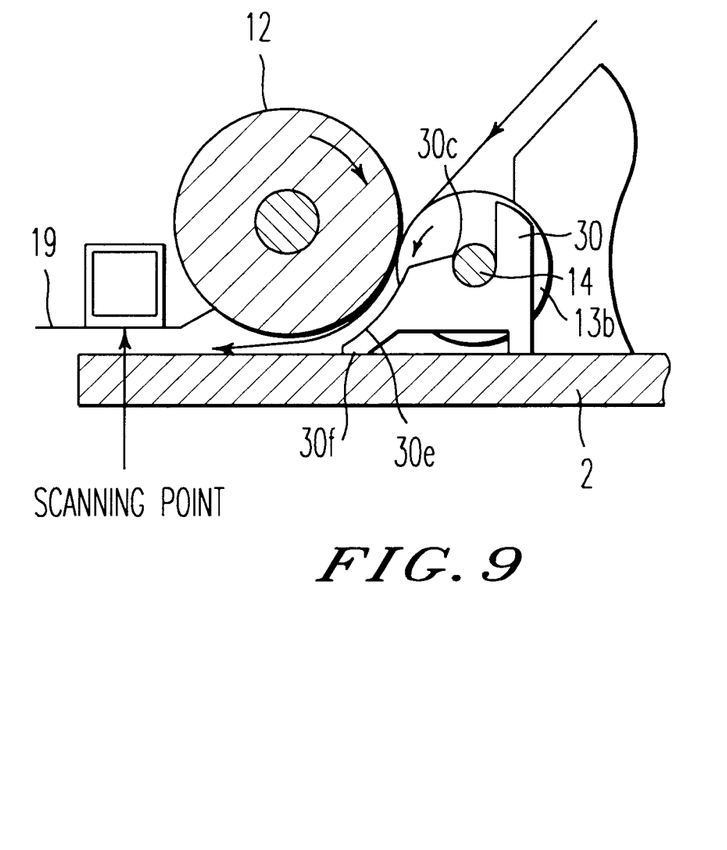
FIG. 9 is a section view of the third embodiment of the present invention for explaining a document feeding operation.

Next, with reference to FIGS. 8 and 9, a description is given of a third embodiment of the present invention. FIG. 8 is a perspective view of a guide member 30 according to a third embodiment of the present invention and FIG. 9 is a diagram for explaining a document feeding operation according to a third embodiment the present invention. In FIG. 8 and 9, the guide member 30 has a front leg 30f and rear legs 30g, but otherwise is similar to the second embodiment.

The front leg 30f is formed at the front-underside edge of the base 30a and extends along the front-underside edge so the front leg 30f carries a portion of the weight of the roller 13 to the contact glass 2. Further, the rear legs 30g are formed at the rear of both side walls 30b and also project toward the contact glass 2. The front leg 30f and rear legs 30g are provided on front and back sides of the U-shaped notch 30c so as to share the loading of the roller 13. When the resist pressure roller 13 and guide member 30 are mounted in the lower unit 7b, the front leg 30f and rear legs 30g contact the contact glass 2 with the axle of the roller 13 positioned on the U-shaped notch 30c as shown in FIG. 9. The base 30a includes a beveled top portion 30r that enables a continuous shape of the sheet bearing edge 30e. To this end, the beveled top portion 30r also becomes part of the sheet bearing edge.

Accordingly, when the resist pressure roller 13 is rotated in the normal direction (direction of the arrow in FIG. 9), the guide member 30 is acted upon by rotation of the rotation axle 14 in a counterclockwise direction, and the front leg 30f is pressed to the contact glass 2 by that force. At this time, the pressing force is offset by the contact between the front leg 30f and contact glass 2 and thus stabilizes the guide member 30 and resist pressure roller 13. On the other hand, when the resist pressure roller 13 is rotated in the reverse direction (opposite direction of the arrow in FIG. 9, which may occur during a paper jam maintenance action, for example) the guide member 30 is acted upon by rotation of the rotation axle 14 in a clockwise direction, and the rear leg 30g is pressed to the contact glass 2 by that force. At this time, this pressing force is offset by the contact between the rear leg 30f and contact glass 2 and thus stabilizes the guide member 30 and resist pressure roller 13.

Accordingly, it is possible to keep the guide member 30 and resist pressure roller 13 stably positioned at all times and improve the certainty of document feeding. Further, by manufacturing the guide member 30 with the front leg 30f and rear legs 30g being the contact surfaces, manufacturing tolerances on the bottom portions of the base 30a and side walls 30b may be relaxed, thereby reducing manufacturing cost while avoiding the risk of the guide member 30 becoming wobbly.

Figure 10:
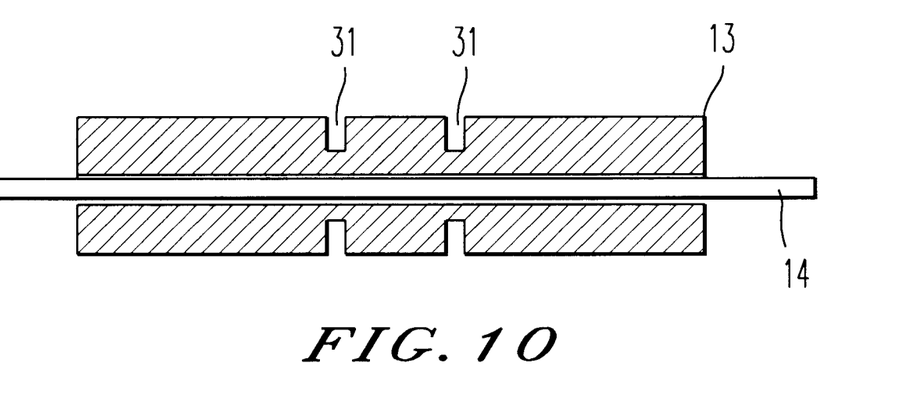
FIG. 10 is a section view of a modified resist pressure roller according to the present invention.

FIG. 10 is a sectional view of a modified resist pressure roller 13 according to the present invention. In FIG. 10, the resist pressure roller 13 is formed in one piece with two ditches 31, but the resist pressure roller 13 is not completely segmented, as is the case with the first three embodiments. By making the resist pressure roller 13 contiguous, rotation of the resist pressure roller 13 at a constant linear velocity is simplified as compared with the segmented rollers of FIGS. 4 and 5, for example, because the roller 13 is formed in one piece. With constant linear velocity, it is possible to prevent the sheet from creasing. Though the resist pressure roller 13 contacts the U-shaped notch 30c at the ditch 31, there is no possibility deformation and excessive loading of the resist pressure roller 13 because the resist pressure roller 13 is formed by a rigid body (not a soft roller such as a resilient spongy roller that would strain the motor that drives the roller 13, where the strain is caused by the frictional resistance of the roller and the guide). However, a soft roller may be used, but with a rigid material inserted in the slots at the interface position with the guide so as to reduce rotation resistance.

The present document claims priority to Japanese patent documents JP 9-193795, filed in the Japanese Patent Office on Jul. 18, 1997, and JP 10-99384, filed in the Japanese Patent Office on Apr. 10, 1998, the entire contents of both of which being incorporated herein by reference.

Obviously, numerous modifications and variations of the present invention are possible in light of the above teachings. It is therefore to be understood that within the scope of the appended claims, the invention may be practiced otherwise than as specifically described herein.

I claim:

1. A sheet guide comprising:
a base configured to be supported by a scanning surface; and
a side wall connected to said base and having an upper portion that extends away from said scanning surface, said side wall having
a notch configured to receive a rotation member of a sheet feeding mechanism, and
a sheet bearing edge configured to change a moving direction of a sheet output from said sheet feeding mechanism.

2. The sheet guide of claim 1, wherein:
said sheet bearing edge being angled in the moving direction toward said scanning surface so as to lower an angle of incidence, between said sheet and said scanning surface.

3. The sheet guide of claim 1 further comprising:
at least one of a front leg and a back leg disposed under said base and being configured to contact said scanning surface.

4. The sheet guide of claim 1, wherein:
said sheet bearing edge being a straight edge set at a predetermined angle with respect to the scanning surface.

5. The sheet guide of claim 1, wherein:
said sheet bearing edge being a curved shape, wherein a tangent of a top portion of said sheet bearing edge being more vertical with respect to said scanning surface than another tangent at a lower portion of the sheet bearing edge.

6. The sheet guide of claim 1, wherein:
said sheet bearing edge forms an angle with said scanning surface, said angle being in a range that includes 45° and 60° and all angles therebetween.

7. The sheet guide of claim 1, wherein:
said sheet bearing edge having a substantially same degree of curvature as a peripheral edge of a roller employed in said sheet feeding mechanism, said peripheral edge of said roller and said sheet bearing edge cooperating to guide said sheet therebetween from said sheet feeding mechanism to said scanning surface.

8. The sheet guide of claim 1, further comprising:
another side wall connected to an opposite side of said base from said sidewall said another side wall having another notch and another sheet bearing edge that cooperate with the notch and the sheet bearing edge of said sidewall to respectively receive the rotation member and change the moving direction of the sheet output from the sheet feeding mechanism so as to lower an angle of incidence between said sheet and said scanning surface.

9. The sheet guide of claim 1, wherein:
said base and said sidewall being integrally formed in one piece.

10. An image scanning apparatus comprising:
a scanning surface having an upper side and a lower side;
a sheet feeding mechanism configured to transport a sheet, with an image thereon, over a scanning position on said upper side of said scanning surface, said sheet feeding mechanism having a rotation member configured to urge said sheet toward said scanning surface;
a scanner positioned below said lower surface and oriented to scan the image on said sheet when said sheet is at said scanning position; and
a sheet guide having
a base supported by said upper side of said scanning surface, and
a side wall connected to said base and having an upper portion that extends away from said scanning surface, said side wall having
a notch configured to receive the rotation member, and a sheet bearing edge configured to change a moving direction of said sheet while said sheet is being urged by said rotation mechanism.

11. The image scanning apparatus of claim 10, wherein: said sheet bearing edge being angled in the moving direction toward said scanning surface so as to lower an angle of incidence, between said sheet and said scanning surface.

12. The image scanning apparatus of claim 10, further comprising:
at least one of a front leg and a back leg disposed under said base and being configured to contact said scanning surface.

13. The image scanning apparatus of claim 10, wherein: said sheet bearing edge being a straight edge set at a predetermined angle with respect to the scanning surface.

14. The image scanning apparatus of claim 10, wherein: said sheet bearing edge being a curved shape edge, wherein a tangent of a top portion of said curved shape edge being more vertical with respect to said scanning surface than another tangent at a bottom portion of the curved shaped edge.

15. The image scanning apparatus of claim 10, wherein: said sheet bearing edge forms an angle with said scanning surface, said angle being in a range that includes 45° and 60° and all angles therebetween.

16. The image scanning apparatus of claim 10, wherein: said sheet bearing edge having a substantially same degree of curvature as a peripheral edge of a roller employed in said sheet feeding mechanism, said peripheral edge of said roller and said sheet bearing edge cooperating to guide said sheet therebetween from said sheet feeding mechanism to said scanning surface.

17. The image scanning apparatus of claim 10, wherein: said sheet feeding mechanism includes a roller as said rotation member, said roller having an outer peripheral surface being configured to contact said sheet and urge said sheet toward said scanning surface, said roller having an axle disposed through a rotational axis of said roller, said axle configured to fit in said notch of said side wall.

18. The image scanning apparatus of claim 17, wherein: said outer peripheral surface having a slot formed therein, said notch of said sidewall positioned to receive said roller at said slot.

19. The image scanning apparatus of claim 18, wherein: said slot divides said roller into two separate roller portions mounted on the axle.

20. The image scanning apparatus of claim 10, wherein: said rotation member being a roller having a slot formed therein, said slot having a depth that extends beneath a peripheral surface of said roller, but not to the axle; and said slot configured to receive said side wall and said roller fit within said notch.

21. The image scanning apparatus of claim 10, further comprising:
another side wall connected to an opposite side of said base from said sidewall said another side wall having another notch and another sheet bearing edge that cooperate with the notch and the sheet bearing edge of said sidewall to respectively receive the rotation member and change the moving direction of the sheet output from the sheet feeding mechanism so as to lower an angle of incidence between said sheet and said scanning surface.

22. The image scanning apparatus of claim 21, wherein: said rotation member being a roller having two notches formed therein, respective of said two notches receiving respective sidewalls of said sheet guide.

23. The image scanning apparatus of claim 22, wherein: said two notches separate said roller into three segments mounted on said axle.

24. The image scanning apparatus of claim 22, wherein: said roller being contiguous and mounted on said axle.

25. The image scanning apparatus of claim 10, wherein: said base and said sidewall being integrally formed in one piece.

26. The image scanning apparatus of claim 10, wherein: said sheet feeding mechanism includes
a first roller as said rotation member, said first roller having a peripheral roller, and
a second roller having another peripheral surface that opposes and contacts at a nip portion the peripheral surface of said first roller, a peripheral edge of said second roller and said sheet bearing edge defining upper and lower sheet boundaries that guide the sheet toward said scanning surface.

27. A sheet guide comprising:
a base having a front side, back side, first side, and second side, said base being configured to be supported by a scanning surface, having
an upper surface having a back end and a front end, said front end having a beveled front edge that tapers toward said scanning surface,
a lower surface having a planer back portion and a front foot projection formed at a front portion thereof, said front foot projection portion extending vertically toward said scanning surface and extending horizontally beneath said beveled front edge, said front foot having a flat bottom surface configured to contact the scanning surface;
a first side wall connected to and extending vertically from said first side of said base, a depth of said first side wall being greater than a depth of said base and having a U-shaped notch having
a rounded bottom portion between a rear vertical projection portion and a front vertical projection portion, said rear vertical projection portion being longer than said front vertical projection portion, and
a flat bottom surface that connects to said front foot projection portion configured to be supported by said scanning surface,
a back foot positioned at a back portion of said flat bottom surface and configured to be supported by said scanning surface,
a sheet bearing having a curved shaped that extends from an upper portion of said front vertical projection portion and down to said beveled edge of said base, and
a second side wall connected to and extending vertically from the second side of said base and having a same shape as said first side wall.

28. A sheet guide comprising:
means for supporting a rotation member of a sheet feeding mechanism; and
means for guiding the sheet from the sheet feeding mechanism to a scanning surface, comprising
means for lowering an angle of incidence that a portion of the sheet makes with the scanning surface after the portion of the sheet is fed from the sheet feeding mechanism toward the scanning surface.

* * * * *